(12) United States Patent
Kishi et al.

(10) Patent No.: US 9,105,944 B2
(45) Date of Patent: Aug. 11, 2015

(54) NONAQUEOUS ELECTROLYTE SECONDARY BATTERY

(75) Inventors: Takashi Kishi, Yokosuka (JP); Norio Takami, Yokohama (JP); Takuya Iwasaki, Uenohara (JP); Hiroki Inagaki, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 890 days.

(21) Appl. No.: 13/208,731

(22) Filed: Aug. 12, 2011

(65) Prior Publication Data
US 2012/0058379 A1   Mar. 8, 2012

(30) Foreign Application Priority Data

Sep. 7, 2010   (JP) ................. 2010-200041

(51) Int. Cl.
*H01M 10/0569* (2010.01)
*H01M 4/52* (2010.01)
*H01M 4/505* (2010.01)
*H01M 4/485* (2010.01)
*H01M 10/052* (2010.01)
*H01M 10/0568* (2010.01)

(52) U.S. Cl.
CPC .......... *H01M 10/0569* (2013.01); *H01M 4/485* (2013.01); *H01M 4/505* (2013.01); *H01M 4/52* (2013.01); *H01M 10/052* (2013.01); *H01M 10/0568* (2013.01); *H01M 2300/004* (2013.01); *Y02E 60/122* (2013.01); *Y02T 10/7011* (2013.01)

(58) Field of Classification Search
CPC ..................... H01M 10/0569; H01M 10/0568; H01M 10/052; H01M 4/52; H01M 4/485; H01M 4/505; H01M 2300/004; Y02E 60/122; Y02T 10/7011
USPC ........ 429/340, 341, 330, 231.1, 231.3, 231.5, 429/218.1, 231.95; 320/137
See application file for complete search history.

(56) References Cited

U.S. PATENT DOCUMENTS

| 7,601,463 | B2 | 10/2009 | Inagaki et al. |
| 2008/0166637 | A1 | 7/2008 | Inagaki et al. |
| 2008/0176142 | A1 | 7/2008 | Inagaki et al. |
| 2009/0297954 | A1 | 12/2009 | Hasegawa et al. |

FOREIGN PATENT DOCUMENTS

| CN | 1412872 A | 4/2003 |
| EP | 1 304 752 A2 | 4/2003 |
| JP | 2000-515672 | 11/2000 |
| JP | 2008-176987 | 7/2008 |
| JP | 4245532 | 1/2009 |
| JP | 2010-50021 | 3/2010 |

OTHER PUBLICATIONS

A. Abouimrane, et al., "Sulfone-based electrolytes for high-voltage Li-ion batteries", Electrochemistry Communications, 11, 2009, pp. 1073-1076.
Kang Xu, et al., "Sulfone-Based Electrolytes for Lithium-Ion Batteries", Journal of the Electrochemical Society, 149 (7), 2002, pp. A920-A926.
Combined Chinese Office Action and Search Report issued Nov. 5, 2013, in Chinese Patent Application No. 201110241351.8 with English translation.
U.S. Appl. No. 13/560,375, filed Jul. 27, 2012, Kishi, et al.

*Primary Examiner* — Laura Weiner
(74) *Attorney, Agent, or Firm* — Oblon, McClelland, Maier & Neustadt, L.L.P.

(57) ABSTRACT

According to one embodiment, a nonaqueous electrolyte secondary battery includes a nonaqueous electrolytic solution, a positive electrode and a negative electrode is provided. The nonaqueous electrolytic solution comprises a nonaqueous solvent. The nonaqueous solvent comprises from 50 to 95% by volume of a sulfone-based compound represented by the following formula 1:

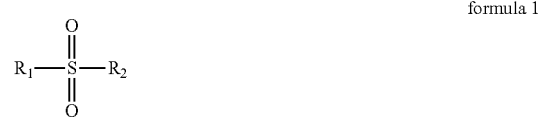

formula 1 wherein $R_1$ and $R_2$ are each an alkyl group having 1 to 6 carbon atoms and satisfy $R_1 \neq R_2$. The positive electrode comprises a composite oxide represented by $Li_{1-x}Mn_{1.5-y}Ni_{0.5-z}M_{y+z}O_4$. The negative electrode comprises a negative electrode active material being capable of absorbing and releasing lithium at 1 V or more based on a metallic lithium potential.

9 Claims, 4 Drawing Sheets

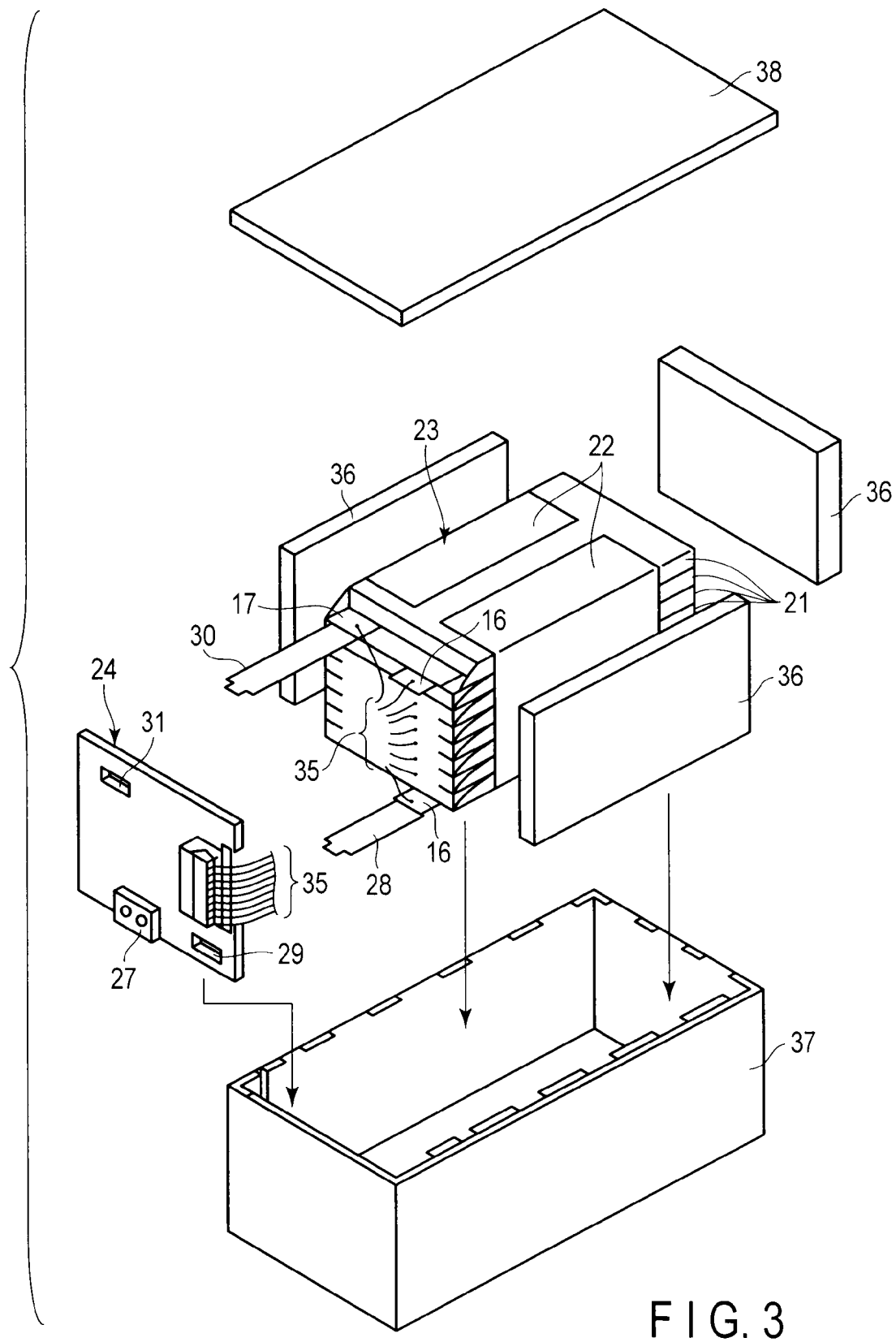
F I G. 3

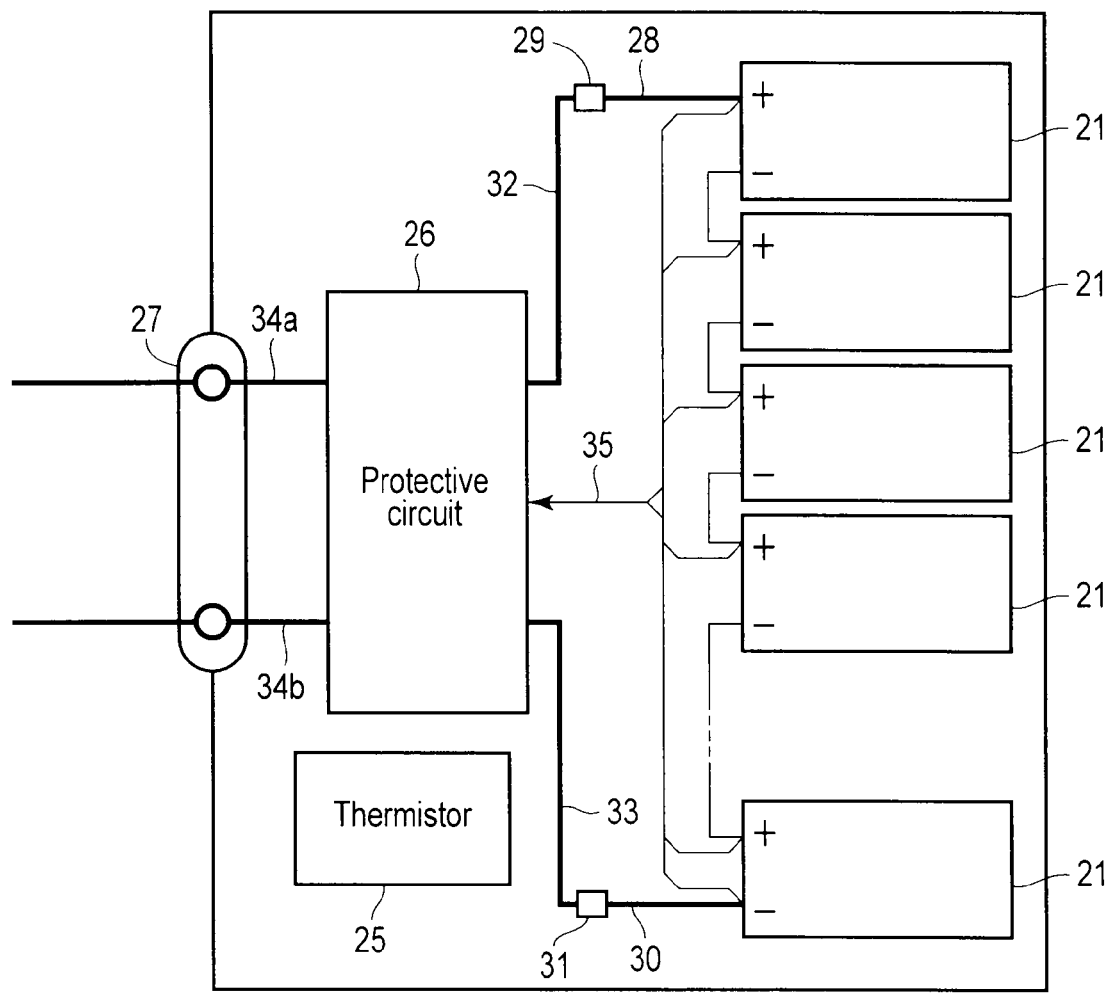
F I G. 4

NONAQUEOUS ELECTROLYTE SECONDARY BATTERY

CROSS-REFERENCE TO RELATED APPLICATIONS

This application is based upon and claims the benefit of priority from prior Japanese Patent Application No. 2010-200041, filed Sep. 7, 2010, the entire contents of which are incorporated herein by reference.

FIELD

Embodiments described herein relate generally to a nonaqueous electrolyte secondary battery and a battery pack comprising the nonaqueous electrolyte battery.

BACKGROUND

Among secondary batteries, a nonaqueous electrolyte secondary battery is a secondary battery that charges and discharges by transfer of lithium ion between positive and negative electrodes. Since a nonaqueous electrolyte secondary battery uses an organic solvent as an electrolytic solution, it may provide a larger voltage than a nickel-cadmium secondary battery and a nickel metal hydride secondary battery, both of which use an aqueous solution. A nonaqueous electrolyte secondary battery that is currently put into practical use uses a lithium-containing cobalt composite oxide or a lithium-containing nickel composite oxide as a positive electrode active material, a carbon-based material and lithium titanate or the like as a negative electrode active material, and uses a lithium salt such as $LiPF_6$ and $LiBF_4$ in the form of a solution in an organic solvent such as cyclic carbonates and linear carbonates as an electrolytic solution. The positive electrode active material has an average working potential of about from 3.4 to 3.8 V based on a metallic lithium potential, and the maximum potential during charging of from 4.1 to 4.3 V based on the metallic lithium potential. On the other hand, the carbon-based material and lithium titanate that are negative electrode active materials have average working potentials of about from 0.05 to 0.5 V and 1.55 V, respectively, vs a metallic lithium potential. By combining these positive and negative electrode active materials, the battery voltage becomes from 2.2 to 3.8 V, and the maximum charge voltage becomes from 2.7 to 4.3 V.

In order to further improve a capacity, use of $LiMn_{1.5}Ni_{0.5}O_4$ that provides the maximum potential during charging of from 4.4 to 5.0 V for a positive electrode is considered. However, in a positive electrode comprising $LiMn_{1.5}Ni_{0.5}O_4$, a carbonate-based solvent causes an oxidation reaction during charging, whereby causes deterioration of cycle performance and generation of gas. Furthermore, sultone and sulfone-based compounds have high viscosity, and the potential of oxidative decomposition is increased, but reactivity with a solvent in a negative electrode is increased. Thus, excellent cycle performance may not be obtained.

BRIEF DESCRIPTION OF THE DRAWINGS

FIG. 3 is an exploded perspective view of a battery pack of a third embodiment;

FIG. 4 is a block drawing showing an electrical circuit of the battery pack of FIG. 3.

DETAILED DESCRIPTION (First Embodiment)

Figure 1:
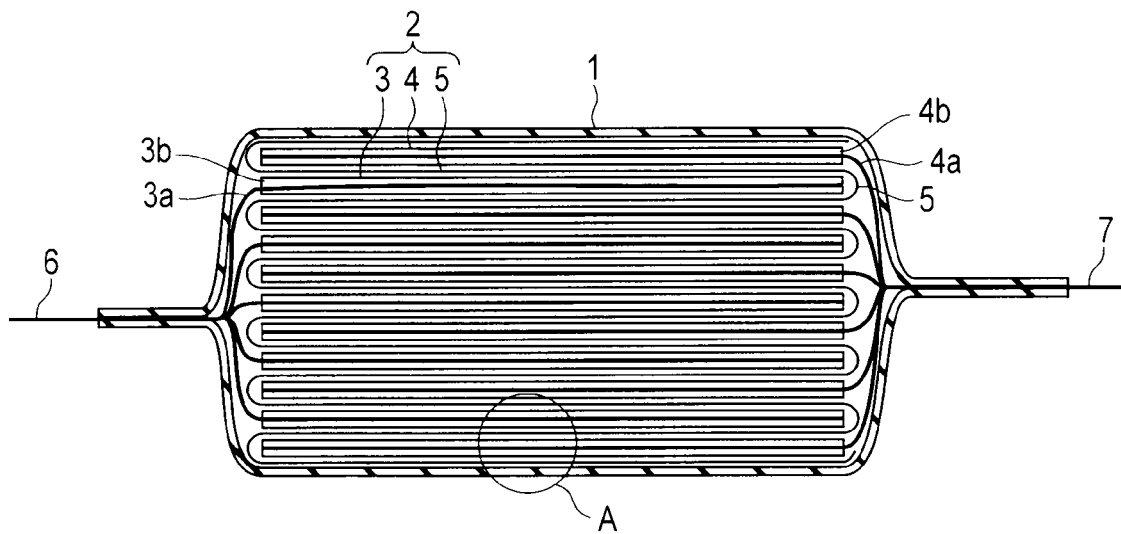
FIG. 1 is a schematic view showing the cross-section of a nonaqueous electrolyte secondary battery of a first embodiment.

In general, according to one embodiment, a nonaqueous electrolyte secondary battery of a first embodiment comprises a case, a nonaqueous electrolytic solution that is housed in the case, a positive electrode that is housed in the case, and a negative electrode that is housed in the case. The nonaqueous electrolytic solution comprises a nonaqueous solvent and a lithium salt dissolved in the nonaqueous solvent. The nonaqueous solvent comprises from 50 to 95% by volume of a sulfone-based compound represented by the following formula 1:

formula 1 wherein $R_1$ and $R_2$ are each an alkyl group having 1 to 6 carbon atoms and satisfy $R_1 \neq R_2$.

The positive electrode comprises a composite oxide represented by the following formula (2):

$$Li_{1-x}Mn_{1.5-y}Ni_{0.5-z}M_{y+z}O_4 \qquad (2)$$

wherein $0 \leq x < 1$, $0 \leq y+z \leq 0.15$, and M is at least one kind of element selected from the group consisting of Mg, Al, Ti, Fe, Co, Ni, Cu, Zn, Ga, Nb, Sn, Zr and Ta.

The negative electrode comprises a negative electrode active material being capable of absorbing and releasing lithium at 1 V or more based on a metallic lithium potential.

The positive electrode comprising the composite oxide represented by Formula 2 may be used at a high potential that is about from 4.4 to 4.9 V of the maximum potential during charging, whereas it has high reactivity with the electrolytic solution. By using the nonaqueous electrolyte solution comprising a nonaqueous solvent comprising the sulfone-based compound represented by Formula 1 by from 50 to 95% by volume and a lithium salt dissolved in the nonaqueous solvent, a high charge capacity may be obtained, and generation of gas may be decreased. As a result, enlarging of the inter-electrode distance between the positive electrode and negative electrode in accordance with the progress of charge-discharge cycles may be suppressed, and thus increase in the internal resistance in accordance with the progress of the charge-discharge cycles may be suppressed. Therefore, battery properties and cycle performance may be improved. Although a specific mechanism of improvement of the properties is unclear, it is presumed that the properties are improved since the sulfone-based compound represented by Formula 1 is anodic stability, and that the nonaqueous electrolytic solution comprising the compound forms layers showing improved properties on the surfaces of the positive and negative electrodes.

Therefore, by using a negative electrode comprising a negative electrode active material being capable of absorbing and releasing lithium at 1 V or more based on a metallic lithium potential together with the positive electrode and nonaqueous electrolytic solution, a 3-V class nonaqueous electrolyte secondary battery having high capacity and a long cycle life may be realized.

Hereinafter, the positive electrode, negative electrode, nonaqueous electrolytic solution and case are explained.

(Positive Electrode)

The positive electrode comprises a positive electrode active material, and may further comprise a substance having electron conductivity such as carbon (hereinafter referred to as an electron conductive substance) and a binder. A sheet obtained by adding a binder to a positive electrode active material and an electron conductive substance, and kneading and rolling the mixture to give a sheet may be used as the positive electrode. Alternatively, it is also possible to form a positive electrode material layer on a current collector by dissolving or suspending a mixture comprising the positive electrode active material, electron conductive substance and binder in a solvent such as toluene and N-methylpyrrolidone (NMP) to give a slurry, applying the slurry on a current collector, drying and pressing the positive electrode material layer and current collector to give a sheet.

Among the composite oxides represented by Formula 2, $LiMn_{1.5}Ni_{0.5}O_4$ may improve the cycle performance of the nonaqueous electrolyte secondary battery, and may decrease the production cost. Furthermore, by replacing a part of Mn or a part of Ni, or a part of Mn and a part of Ni in Formula 2 with Mg, Al, Ti, Fe, Co, Ni, Cu, Zn, Ga, Nb, Sn, Zr or Ta, the surface activity of the positive electrode active material is decreased, whereby increase in the battery resistance may further be suppressed. Substitution with Mg or Zr, or by both elements is desirable since it is highly effective. The amount of substitution (y+z) is desirably 0.01 or More in view of suppression of surface activity, and is desirably 0.15 or less in view of improvement of capacity. A further preferable range is from 0.03 to 0.1. In addition, the molar ratio of Li (1−x) may vary in the range of $0 \leq x < 1$ depending on absorption and release of lithium in accordance with a charge-discharge reaction.

Among the composite oxides represented by Formula 2, one kind may be used as the positive electrode active material, or a mixture of two or more kinds may be used as the positive electrode active material.

Examples of the binder may include polytetrafluoroethylene (PTFE), polyvinylidene fluoride (PVdF), ethylene-propylene-diene copolymer, styrene-butadiene rubber and the like.

It is desirable that the positive electrode comprises a current collector, and a positive electrode material layer formed on one surface or both surfaces of the current collector. When the positive electrode material layer comprises the positive electrode active material, electron conductive substance and binder, the mixing ratio of the positive electrode active material, electron conductive substance and binder is preferably from 75 to 98% by weight of the positive electrode active material, from 1 to 20% by weight of the electron conductive substance, and from 1 to 7% by weight of the binder with respect to 100% by weight of the positive electrode material layer.

For example, a substrate having electron conductivity such as a metal or the like may be used for the current collector. Examples of the current collector may include metal foils, thin plates or meshes, metal meshes and the like. Examples of the metal for the current collector may include aluminum, stainless, titanium and the like.

It is desirable that the maximum positive electrode potential during charging falls within the range of from 4.4 to 4.9 V based on a metallic lithium potential. By charging to such potential, high capacity may be obtained. Furthermore, it is more desirable to adjust the maximum potential to from 4.6 to 4.8 V based on a metallic lithium potential since high capacity and suppression of side reactions may be achieved. In addition, it is desirable to adjust the minimum potential during discharging of the positive electrode to from 4.0 to 4.3 V based on a metallic lithium potential since deterioration of the positive electrode active material may be minimized and higher cycle performance may be obtained.

(Negative Electrode)

The negative electrode comprises a negative electrode active material, and may further comprise a conductive material, a binder and the like. The form of the negative electrode may be a pellet shape, a thin plate shape or a sheet shape.

The negative electrode is obtained, for example, by adding the binder to the negative electrode active material and conductive material, and molding the mixture into a pellet or sheet by kneading and rolling. Alternatively, a current collector on which a negative electrode material layer is formed, which is obtained by dissolving or suspending a mixture comprising the negative electrode active material, conductive material and binder in a solvent such as water and N-methylpyrrolidone (NMP) to prepare a slurry, applying the slurry on the current collector, drying and pressing to give a sheet, may be used as the negative electrode.

It is desirable that the upper limit of the lithium absorption release potential is adjusted to 3.0 V based on a metallic lithium potential. Furthermore, examples of the negative electrode active material being capable of absorbing and releasing lithium at 1 V or more based on a metallic lithium potential may include spinel-type lithium titanate, monoclinic system titanium dioxide, iron sulfide and the like. The kind of negative electrode active material used may be one kind or two or more kinds. An oxide comprising Ti such as spinel-type lithium titanate and monoclinic system titanium dioxide is desirable in that flatness of a charge-discharge curve is high, the potentials of the positive and negative electrodes are easily controlled when combined with the positive electrode, and variation due to progression of cycles is suppressed to the minimum, whereby high cycle performance may be realized.

Examples of the conductive material may include substances having electron conductivity (hereinafter referred to as electron conductive substances) such as carbon and metals. The form of the conductive material is desirably a form of granular, fiber or the like.

Examples of the binder may include polytetrafluoroethylene (PTFE), polyvinylidene fluoride (PVdF), styrene-butadiene rubber, carboxymethylcellulose (CMC) and the like.

It is desirable that the negative electrode comprises a current collector and a negative electrode material layer formed on one surface or both surfaces of the current collector. When the negative electrode material layer comprises the negative electrode active material, conductive material and binder, the mixing ratio of the negative electrode active material, conductive material and binder is preferably in the ranges of 73 to 98% by weight of the negative electrode active material, 1 to 20% by weight of the conductive material and 1 to 7% by weight of the binder based on 100% by weight of the negative electrode material layer.

Examples of the current collector may include metal foils, thin plates or meshes, metal meshes and the like. Examples of the metal may include copper, stainless, nickel and the like.

It is desirable that the minimum negative electrode potential during charging falls within the range of 1 V or more based on a metallic lithium potential. Accordingly, the side reaction between the negative electrode and sulfone-based compound may be suppressed. By adjusting the minimum negative electrode potential during charging to from 1 to 1.5 V, when the negative electrode and positive electrode are combined, the side reaction in which the electrolytic solution is involved may be suppressed to the minimum, whereby high charge-discharge efficiency and high cycle performance may be realized. Furthermore, it is more desirable to adjust the minimum negative electrode potential during charging to from 1.35 to 1.45 V based on a metallic lithium potential, deterioration of the negative electrode active material during cycles may further be decreased, and increase in impedance may be suppressed. Furthermore, it is more desirable to adjust the maximum negative electrode potential during discharging to from 1.6 to 2 V based on a metallic lithium potential since deterioration of the negative electrode active material during cycles may further be decreased. Examples of the negative electrode active material that may be operated at such potential may include spinel-type lithium titanate, monoclinic system titanium dioxide, iron sulfide and the like. Of these, oxides comprising Ti such as spinel-type lithium titanate and monoclinic system titanium dioxide provide high flatness of a charge-discharge curve. Therefore, the negative electrode comprising the oxide comprising Ti is desirable since it may readily control the potentials of the positive and negative electrodes when combined with the positive electrode, may suppress variation due to progression of cycles and may realize a high cycle performance.

(Nonaqueous Electrolytic Solution)

The nonaqueous electrolytic solution comprises a nonaqueous solvent comprising from 50 to 95% by volume of a sulfone-based compound represented by Formula 1, and a lithium salt dissolved in the nonaqueous solvent.

$R_1$ and $R_2$ in Formula 1 are each an alkyl group having 1 to 6 carbon atoms and satisfy $R_1 \neq R_2$. Examples of the alkyl group may include a methyl group, an ethyl group, a butyl group, an isopropyl group and the like. When the kind of alkyl group for $R_1$ and the kind of alkyl group for $R_2$ are the same, the sulfone-based compound has symmetry. Therefore, the sulfone-based compound is readily precipitated as a solid in the nonaqueous electrolytic solution, whereby the low temperature performance of the battery is deteriorated. When the kind of alkyl group for $R_1$ and the kind of alkyl group for $R_2$ are different, precipitation of the sulfone-based compound in the nonaqueous electrolytic solution may be suppressed, whereby excellent low temperature performance may be obtained.

Preferable Examples of the sulfone-based compound may include isopropyl methyl sulfone wherein $R_1$ is a methyl group and $R_2$ is an isopropyl group, ethyl isopropyl sulfone wherein $R_1$ is an ethyl group and $R_2$ is an isopropyl group, and the like. Since these compounds have a low melting point and a low molecular weight, high solubility of the lithium salt may be expected. Furthermore, normal butyl normal propyl sulfone, ethyl normal propyl sulfone and the like are desirable since they have a low melting point and a higher molecular weight, and thus a high boiling point and a high flash point may be expected. The kind of sulfone-based compound used may be one kind or two or more kinds.

When the amount of the sulfone-based compound in the nonaqueous solvent is lower than 50% by volume, oxidation decomposition of the nonaqueous electrolytic solution by the positive electrode proceeds, whereby a charge-discharge cycle life is shorten. On the other hand, when the amount of the sulfone-based compound in the nonaqueous solvent is more than 95% by volume, reduction decomposition of the nonaqueous electrolytic solution by the negative electrode, decrease in output due to decrease in dissociation of the lithium salt, and increase in the viscosity of the electrolytic solution are caused, whereby a charge-discharge cycle life and output are decreased. Accordingly, it is desirable that the content of the sulfone-based compound in the nonaqueous solvent is in the range of from 50 to 95% by volume.

The nonaqueous solvent may include a sultone-based compound besides the sulfone-based compound represented by Formula 1. Accordingly, high cycle performance may be obtained and the amount of gas generation may be decreased. As the sultone-based compound, various cyclic sultones may be used. Examples of the cyclic sultone-based compound may include 1,3-propanesultone, 1,4-butanesultone and the like. The kind of sultone-based compound used may be one kind or two or more kinds.

It is desirable that the total amount of the sulfone-based compound and sultone-based compound is 80% by volume or more of the nonaqueous solvent. Accordingly, a nonaqueous electrolyte secondary battery that generates a low amount of gas and is excellent in cycle performance may be realized. This effect may also be obtained when the total amount of the sulfone-based compound and sultone-based compound is adjusted to 100% by volume of the nonaqueous solvent.

The nonaqueous solvent may include other organic solvent other than the sulfone-based compound and sultone-based compound. Examples of the other solvent may include ethylene carbonate (EC), propylene carbonate (PC), dimethyl carbonate (DMC), methyl ethyl carbonate (MEC), diethyl carbonate (DEC), γ-butyrolactone (BL), acetonitrile (AN), ethyl acetate (EA), toluene, xylene, methyl acetate (MA) and the like. The kind of organic solvent used may be one kind or two or more kinds. In order to compensate the low solubility of the lithium salt in the sulfone-based compound, cyclic carbonates such as EC and PC that have a high dielectric constant and high lithium salt solubility are desirable. In order to suppress gas generation and further improve cycle performance, it is desirable that the nonaqueous solvent comprises the sulfone-based compound represented by Formula 1 by from 50 to 95% by volume and the cyclic carbonate by from 5 to 50% by volume (more preferably from 20 to 50% by volume). When the content of the cyclic carbonate in the nonaqueous solvent is from 20 to 50% by volume, it is desirable that the content of the sulfone-based compound in the nonaqueous solvent is adjusted to from 50 to 80% by volume. Furthermore, in view of improvement of ion conductivity and improvement of impregnability by decreasing viscosity, chain carbonates such as DMC, DEC and MEC are desirable.

Examples of the lithium salt may include lithium perchlorate ($LiClO_4$), lithium hexafluorophosphate ($LiPF_6$), lithium tetrafluoroborate ($LiBF_4$), lithium trifluoromethylsulfonate, lithium bistrifluoromethylsulfonylimide (LiTFSI), lithium bispentafluoroethylsulfonylimide and the like. The kind of lithium salt used may be one kind or two or more kinds. $LiPF_6$ and $LiBF_4$ are desirable since the concentration of the lithium salt may be increased and better cycle performance may be obtained, and a mixed salt thereof may also be used.

The electrolytic solution in the nonaqueous electrolyte secondary battery may be obtained by cutting a case (for example, a metal can, a container made of an aluminum-containing laminate film, or the like), removing a laminate or wound body comprising electrodes and a separator in which the electrolytic solution has been soaked, and expressing the solution therefrom. The solution may be collected by applying a pressure to the above-mentioned laminate or wound body, or may be collected by centrifugation. The obtained solution may be separated by fractional distillation by utilizing difference in boiling points, and the constitutional compound species may be identified by an NMR method. Alternatively, the solution may be analyzed by chromatography. In this case, after identification of the compound species by mass analysis or the like, the correlationships between the amounts of the compounds and detection sensitivities are measured and are checked against the detection sensitivities of an object solution to be analyzed, whereby the composition of the various compound species in the object solution may be determined.

(Case)

Examples of the case may include cans made of metals or resins, and containers made of laminates. Examples of the metal cans may include square-shaped containers of aluminum, iron, stainless and the like. Alternatively, square-shaped containers of plastics, ceramics and the like may also be used as the case. Examples of the laminate containers may include one obtained by combining a metal layer of aluminum, copper, stainless or the like with a resin layer to give a laminate material, and forming the laminate material into a sac-like shape by hot melt adhesion. The laminate container is desirable since generation of gas inside of the container may be detected as a change in the appearance of the battery.

In the initial charging of the nonaqueous electrolyte secondary battery, gas is generated in the case by the reaction between the negative electrode and the nonaqueous electrolytic solution (reduction decomposition of the nonaqueous electrolytic solution by the negative electrode). The gas generated by the reaction between the negative electrode and the nonaqueous electrolytic solution may be removed by removing the gas in the case after the initial charging, or after further charging and discharging one or more times after the initial charging and discharging. According to the first embodiment, the gas generation by the reaction between the positive electrode and the nonaqueous electrolytic solution may be decreased. Therefore, by removing the gas derived from the negative electrode by a removal treatment, the amount of the gas in the case may further be decreased, whereby cycle performance may further be improved.

Figure 2:
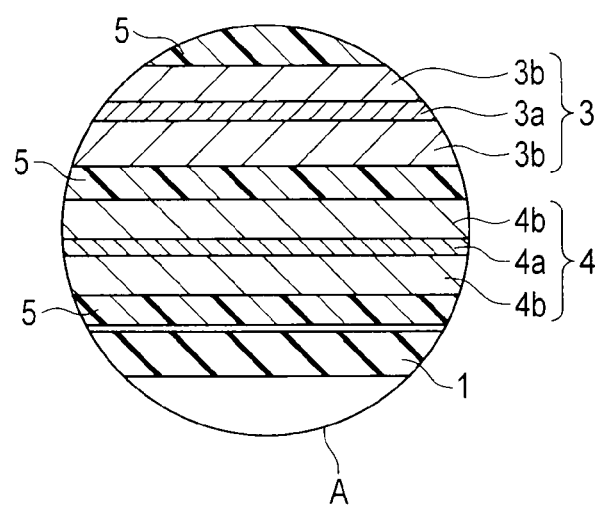
FIG. 2 is an enlarged cross-sectional view showing a portion A of FIG. 1.

The specific example of the nonaqueous electrolyte secondary battery of the first embodiment is shown in FIGS. 1 and 2. FIG. 1 is a view that schematically shows the cross-section obtained by cutting a flat-type nonaqueous electrolyte secondary battery in the direction of the thickness of the battery, and FIG. 2 is an enlarged cross-sectional view showing the portion A of FIG. 1. The nonaqueous electrolyte secondary battery comprises a case 1 made of a laminate film, an electrode group 2 that is housed in the case 1, and a nonaqueous electrolytic solution (not shown). The case 1 made of a laminate film is obtained by molding a laminate film comprising a metal layer combined with a resin layer into a sac-like shape by hot melt adhesion. The electrode group 2 comprises a plurality of sets of a positive electrode 3, a negative electrode 4 and a separator 5 that provided between the positive electrode 3 and the negative electrode 4, wherein the sets are stacked sequentially. The positive electrode 3 comprises a positive electrode current collector 3a, and a positive electrode material layer 3b that is held by both sides or one side of the positive electrode current collector 3a. The negative electrode 4 comprises a negative electrode current collector 4a, and a negative electrode material layer 4b that is held by both sides or one side of the negative electrode current collector 4a. A belt-shaped positive electrode terminal 6 is electrically connected to the positive electrode current collector 3a of the positive electrode 3, and the tip thereof is extended to outside through the hot melt-adhered part of the case 1. On the other hand, a belt-shaped negative electrode terminal 7 is electrically connected to the negative electrode current collector 4a of the negative electrode 4, and the tip thereof is extended to outside through the hot melt-adhered part of the case 1.

Examples of the separator may include polyolefin porous films of polyethylene, polypropylene and the like, cellulose nonwoven fabric, polyethylene terephthalate nonwoven fabric, and polyolefin nonwoven fabric.

The positive electrode terminal is electrically connected to the positive electrode, and has a function to electrically bridge the outside of the battery and the positive electrode. The shape of the positive electrode terminal is not limited to the belt shape as shown in FIG. 1, and may have, for example, a ribbon shape or rod shape. Furthermore, a part of the positive electrode current collector may be used as the positive electrode terminal, or the positive electrode terminal may be a part other than the positive electrode current collector. The positive electrode terminal may be formed of, for example, aluminum, an aluminum alloy, titanium or the like.

The negative electrode terminal is electrically connected to the negative electrode, and has a function to electrically bridge the outside of the battery and the negative electrode. The shape of the negative electrode terminal is not limited to the belt shape as shown in FIG. 1, and may have, for example, a ribbon shape or rod shape. Furthermore, a part of the negative electrode current collector may be used as the negative electrode terminal, or the negative electrode terminal may be a part other than the negative electrode current collector. The negative electrode terminal may be formed of, for example, aluminum, an aluminum alloy, copper, stainless or the like. Aluminum and an aluminum alloy are desirable since they are light and excellent in weldability.

Although FIGS. 1 and 2 show a nonaqueous electrolyte secondary battery comprising a laminated electrode group and a case made of a laminate, the form of the electrode group and the kind of case of the nonaqueous electrolyte secondary battery are not limited to those shown in the drawings, and any form and kind may be used as long as they may be used for a nonaqueous electrolyte secondary battery. For example, a wound type electrode group may be used, and a metal can may be used for the case.

(Second Embodiment)

The battery pack of the second embodiment comprises one or a plurality of the nonaqueous electrolyte secondary battery (unit cell) of the first embodiment. When it has the unit cells, they are connected with each other in electrically series or parallel.

Such battery pack is explained in detail with reference to FIGS. 3 and 4.

For example, a flat-type nonaqueous electrolyte secondary battery may be used for the unit cells. The unit cells 21 that are constituted by flat-type nonaqueous electrolyte secondary batteries are stacked so that a positive electrode terminal 16 and a negative electrode terminal 17 that are extended to outside are aligned in the same direction, and are bound by an adhesive tape 22 to constitute a battery module 23. As shown in FIG. 4, the unit cells 21 are connected electrically in series with each other.

A printed wiring board 24 is disposed opposing to the side surface of the unit cells 21 from which the negative electrode terminal 17 and positive electrode terminal 16 are extended. As shown in FIG. 4, a thermistor 25, a protective circuit 26, and a terminal 27 for carrying a current to an external device are mounted on the printed wiring board 24. In addition, an insulating board (not shown) is attached to the surface of the protective circuit substrate 24, which faces the battery module 23, so as to avoid unnecessary connection with the wiring of the battery module 23.

A positive electrode lead 28 is connected to the positive electrode terminal 16 that is positioned at the lowermost layer of the battery module 23, and the tip thereof is inserted to and electrically connected to a positive electrode connector 29 of the printed wiring board 24. A negative electrode lead 30 is connected to the negative electrode terminal 17 that is positioned at the uppermost layer of the battery module 23, and the tip thereof is inserted to and electrically connected to a negative electrode connector 31 of the printed wiring board 24. These connectors 29 and 31 are connected to a protective circuit 26 via wirings 32 and 33 that are formed on the printed wiring board 24.

The thermistor 25 detects the temperature of the unit cells 21, and the detection signal thereof is sent to the protective circuit 26. The protective circuit 26 may break a plus wiring 34a and a minus wiring 34b between the protective circuit 26 and the terminal 27 for carrying a current to an external device, under a predetermined condition. The predetermined condition refers to, for example, the time at which the detection temperature of the thermistor 25 reaches a predetermined temperature or more. Furthermore, the predetermined condition refers to the time at which over-charge, over-discharge, over-current or the like of the unit cells 21 are detected. The detection of over-charge or the like is performed in the individual unit cells 21 or the entirety of the unit cells 21. When detection is performed in the individual unit cell 21, a battery voltage may be detected, or a positive electrode potential or negative electrode potential may be detected. In the latter case, a lithium electrode that is used as a reference electrode is inserted in the individual unit cell 21. In the case of FIGS. 3 and 4, wirings 35 for detection of a voltage are connected to the respective unit cells 21, and detection signals are sent to the protective circuit 26 via the wirings 35.

Protective sheets 36 made of a rubber or resin are disposed respectively on the three side surfaces of the battery module 23 except for the side surface from which the positive electrode terminal 16 and negative electrode terminal 17 protrude.

The battery module 23 is housed in a housing container 37 together with the respective protective sheets 36 and the printed wiring board 24. Namely, the protective sheets 36 are disposed respectively on the both inner surfaces in the longitudinal side direction and the inner surface in the short side direction of the housing container 37, and the printed wiring board 24 is disposed on the inner surface on the opposite side in the short side direction. The battery module 23 is positioned in a space surrounded by the protective sheets 36 and the printed wiring board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Although an embodiment in which the unit cells 21 are connected with each other in series is shown in FIGS. 3 and 4, the unit cells may be connected with each other in parallel so as to increase a battery capacity. Alternatively, assembled battery packs may be connected with each other in series or parallel.

Furthermore, the embodiment of the battery pack is suitably changed according to use. Preferable use of the battery pack is one for which cycle performance at high currents is desired. Specific examples may include uses in power sources for digital cameras, and in-car uses in two to four-wheeled hybrid battery automobiles, two to four-wheeled battery automobiles, motor assisted bicycles and the like. In-car uses are preferable.

EXAMPLES

Hereinafter, the Examples of the embodiments are explained in detail with reference to the drawings. In the following Examples, the battery structure shown in FIG. 1 was adopted.

Example 1

A slurry was prepared by kneading 90% by weight of $LiMn_{1.5}Ni_{0.5}O_4$ powder as positive electrode active material, 2% by weight of acetylene black and 5% by weight of graphite, 5% by weight of polyvinylidene fluoride as a binder, and N-methylpyrrolidone as a solvent. The obtained slurry was applied on the both surfaces of an aluminum foil having a thickness of 15 μm as a positive electrode current collector. At that time, the slurry was not applied on the part at 5 mm from one long side edge of the positive electrode current collector, whereby an unapplied part was formed. The current collector on which the slurry had been applied was subsequently dried and pressed to prepare a positive electrode sheet having a width of 69 mm and a length of 93 mm. Aluminum ribbons each having a width of 5 mm and a thickness of 0.1 mm were weld on the three parts on the unapplied part of the positive electrode sheet to form positive electrode tabs.

A slurry was prepared by adding 90% by weight of $Li_4Ti_5O_{12}$ powder as a negative electrode active material and 5% by weight of artificial graphite as electron conductive substance and 5% by weight of polyvinylidene fluoride (PVdF) to an N-methylpyrrolidone (NMP) solution and mixing them. The obtained slurry was applied on both surfaces of an aluminum foil having a thickness of 25 μm as a negative electrode current collector. At that time, the slurry was not applied on a part at 5 mm from one longitudinal side edge of the negative electrode current collector, whereby an unapplied part was formed. The current collector on which the slurry had been applied was subsequently dried and pressed to give a negative electrode sheet. The obtained negative electrode sheet was cut into a width 70 mm and a length of 91 mm so that the unapplied portion was present on the part at 5 mm from one longitudinal side edge. Aluminum ribbons each having a width of 5 mm and a thickness of 0.1 mm were weld on the three parts on the unapplied part to form negative electrode tabs.

A polyethylene porous film having a thickness of 30 μm and a width of 72 mm was used as a separator. The belt-shaped positive electrode sheet, separator, belt-shaped negative electrode sheet and separator were stacked 25 times, each in this order, to prepare an electrode group. Three positive electrode tabs were superposed, and weld on a positive electrode terminal composed of an aluminum sheet having a thickness of 0.1 mm, a width of 30 mm and a length of 50 mm. Three negative electrode tabs were superposed, and weld on a negative electrode terminal composed of an aluminum sheet having a thickness of 0.1 mm, a width of 30 mm and a length of 50 mm.

The electrode group was housed in a case made of an aluminum-containing laminate film. 1 M of $LiBF_4$ was dissolved in a nonaqueous solvent obtained by mixing ethyl isopropyl sulfone (EIPS) and propylene carbonate (PC) at a volume ratio of 1:1 to give a nonaqueous electrolytic solution. The amount of the sulfone-based compound in the nonaqueous solvent was 50% by volume. The nonaqueous electrolytic solution in an amount of such a degree that the entirety of the electrode group is soaked was injected to the electrode group in the case, and the case was sealed by heat sealing to prepare a nonaqueous electrolyte secondary battery.

Example 2

A nonaqueous electrolyte secondary battery was prepared in a similar manner to Example 1, except that diethylcarbonate (DEC) was used instead of PC.

Example 3

A nonaqueous electrolyte secondary battery was prepared in a similar manner to Example 1, except that isopropyl methyl sulfone (IPMS) was used instead of EIPS.

Example 4

A nonaqueous electrolyte secondary battery was prepared in a similar manner to Example 1, except that the mixing volume ratio of EIPS:PC was adjusted to 95:5 and the amount of the sulfone-based compound in the nonaqueous solvent was adjusted to 95% by volume.

Example 5

A nonaqueous electrolyte secondary battery was prepared in a similar manner to Example 1, except that EIPS, propanesultone (PS) and PC were mixed by a volume ratio of 90:5:5, the amount of the sulfone-based compound in the nonaqueous solvent was adjusted to 90% by volume, and the total amount of the sulfone-based compound and sultone-based compound was adjusted to 95% by volume.

Comparative Example 1

A nonaqueous electrolyte secondary battery was prepared in a similar manner to Example 1, except that a nonaqueous electrolytic solution obtained by dissolving 1 M of $LiPF_6$ in a mixture of ethylene carbonate (EC) and diethyl carbonate (DEC) at a volume ratio of 1:2.

Comparative Example 2

A nonaqueous electrolyte secondary battery was prepared in a similar manner to Example 1, except that a nonaqueous electrolytic solution obtained by dissolving 1 M of $LiBF_4$ in only EIPS was used.

Comparative Example 3

Dimethylsulfone (DES) and PC were mixed at a volume ratio 1:1 on a hot plate of 60° C. 1 M of $LiBF_4$ was dissolved in this solution. DEC has a solid at an normal temperatures and $R_1$ and $R_2$ in Formula 1 both being methyl groups. However, a white solid was precipitated when the temperature was decreased to room temperature, and the solution was separated into a liquid layer and the precipitated solid and could not be used as a nonaqueous electrolytic solution. Accordingly, an evaluation may not be performed.

The nonaqueous electrolyte secondary batteries obtained in Examples 1 to 5 and Comparative Examples 1 and 2 were each constant current constant voltage charged to 3.3 V at 1.5 A to attainment of 30 mV, and discharged to 2.7 V at 1.5 A. This was repeated twice, the battery was stored at 45° C. for 40 hours, the gas in the case was removed by vacuum, and the case was sealed again. Thereafter charging and discharging were performed 100 times under the same condition as mentioned above. The relationships between the number of the charge-discharge cycles and the discharge capacity maintenance rate are shown in FIG. 5.

Figure 5:
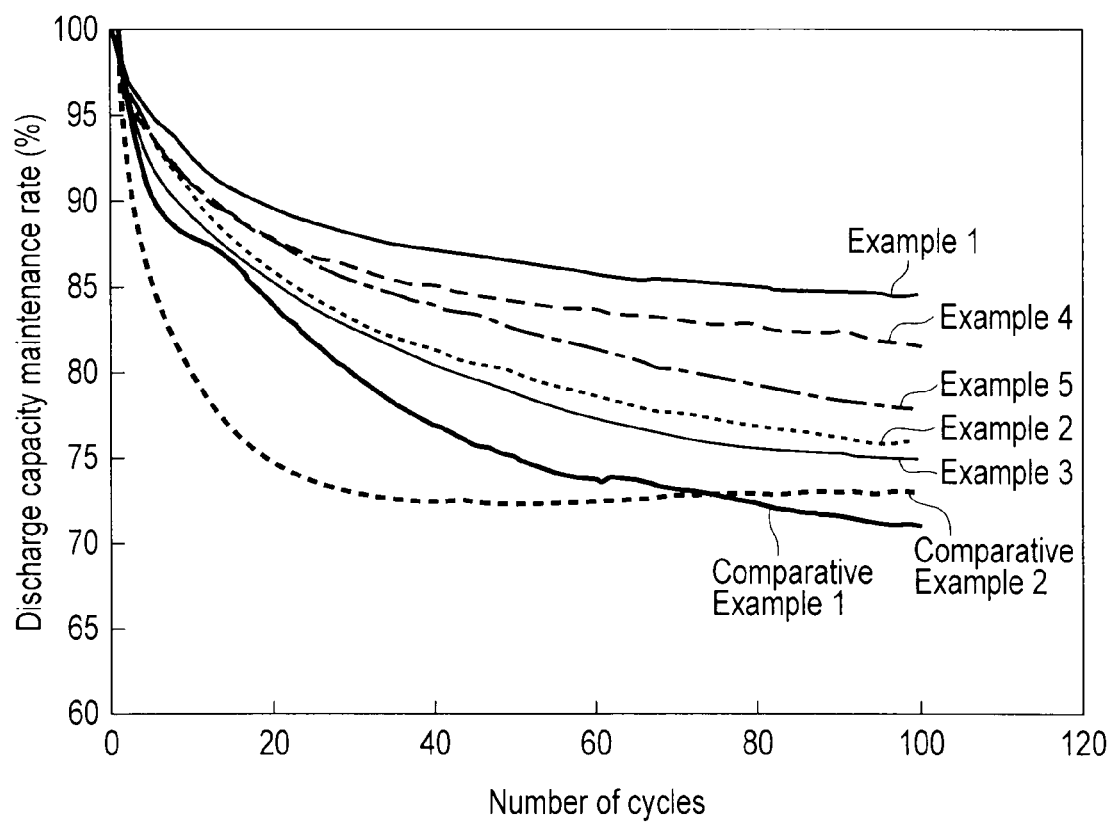
FIG. 5 is a graph showing the changes in the discharge capacity maintenance rates in Examples and Comparative Examples.

As is apparent from FIG. 5, according to Examples 1 to 5, it is found that the decrease in the discharge capacity maintenance rate in accordance with the progress of the charge-discharge cycles is moderate as compared to Comparative Examples 1 and 2, and higher cycle performance may be obtained. By comparing Examples 1 and 2, it is found that the cycle performance was more excellent in the case when the cyclic carbonate was used (Example 1) than in the case when DEC was used (Example 2). Furthermore, by comparing Examples 1 and 3, it is found that more excellent cycle performance may be obtained in the case when EIPS was used as the sultone-based compound than in the case when IPMS was used.

According to the embodiments and Examples as explained above, the cycle performance of the nonaqueous electrolyte secondary battery may be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte secondary battery, comprising:
   a case;
   a nonaqueous electrolytic solution provided in the case and comprising a nonaqueous solvent and a lithium salt dissolved in the nonaqueous solvent, the nonaqueous solvent comprising from 50 to 95% by volume of a sulfone-based compound consisting of ethyl isopropyl sulfone and from 5 to 50% by volume of a cyclic carbonate;
   a positive electrode provided in the case and comprising a composite oxide represented by $Li_{1-x}Mn_{1.5-y}Ni_{0.5-z}M_{y+z}O_4$, wherein $0 \leq x < 1$, $0 \leq y+z \leq 0.15$, and M is at least one selected from the group consisting of Mg, Al, Ti, Fe, Co, Ni, Cu, Zn, Ga, Nb, Sn, Zr and Ta; and
   a negative electrode provided in the case and comprising a negative electrode active material being capable of absorbing and releasing lithium at 1 V or more based on a metallic lithium potential.

2. The battery according to claim 1, wherein the negative electrode active material comprises an oxide comprising Ti.

3. The battery according to claim 2, wherein the oxide comprising Ti comprises at least one selected from the group consisting of spinel-type lithium titanate and monoclinic system titanium dioxide.

4. The battery according to claim 1, wherein the nonaqueous solvent further comprises a sultone-based compound, which comprises at least one selected from the group consisting of 1,3-propanesultone and 1,4-butanesultone,
   wherein a total amount of the sulfone-based compound and the sultone-based compound is from 80 to 100% by volume of the nonaqueous solvent.

5. The battery according to claim 1, wherein the nonaqueous solvent comprises the sulfone-based compound by from 50 to 80% by volume and the cyclic carbonate by from 20 to 50% by volume.

6. The battery according to claim 1, wherein the lithium salt comprises at least one of $LiPF_6$ and $LiBF_4$.

7. The battery according to claim 1, which has been subjected to a treatment comprising charging the battery one or more times and removing gas in the case.

8. The battery according to claim 1, wherein the negative electrode active material comprises at least one selected from the group consisting of spinel-type lithium titanate and monoclinic system titanium dioxide, and the nonaqueous solvent further comprises a sultone-based compound comprising at least one selected from the group consisting of 1,3-propanesultone and 1,4-butanesultone, and a total amount of the sulfone-based compound and the sultone-based compound is from 80% to 100% by volume of the nonaqueous solvent.

9. A battery pack comprising the nonaqueous electrolyte secondary battery according to claim 1.

* * * * *